Aug. 19, 1947.    G. W. CRISE    2,425,998
THERMOSTAT CONTROL MECHANISM FOR HEATING SYSTEMS
Filed May 27, 1943
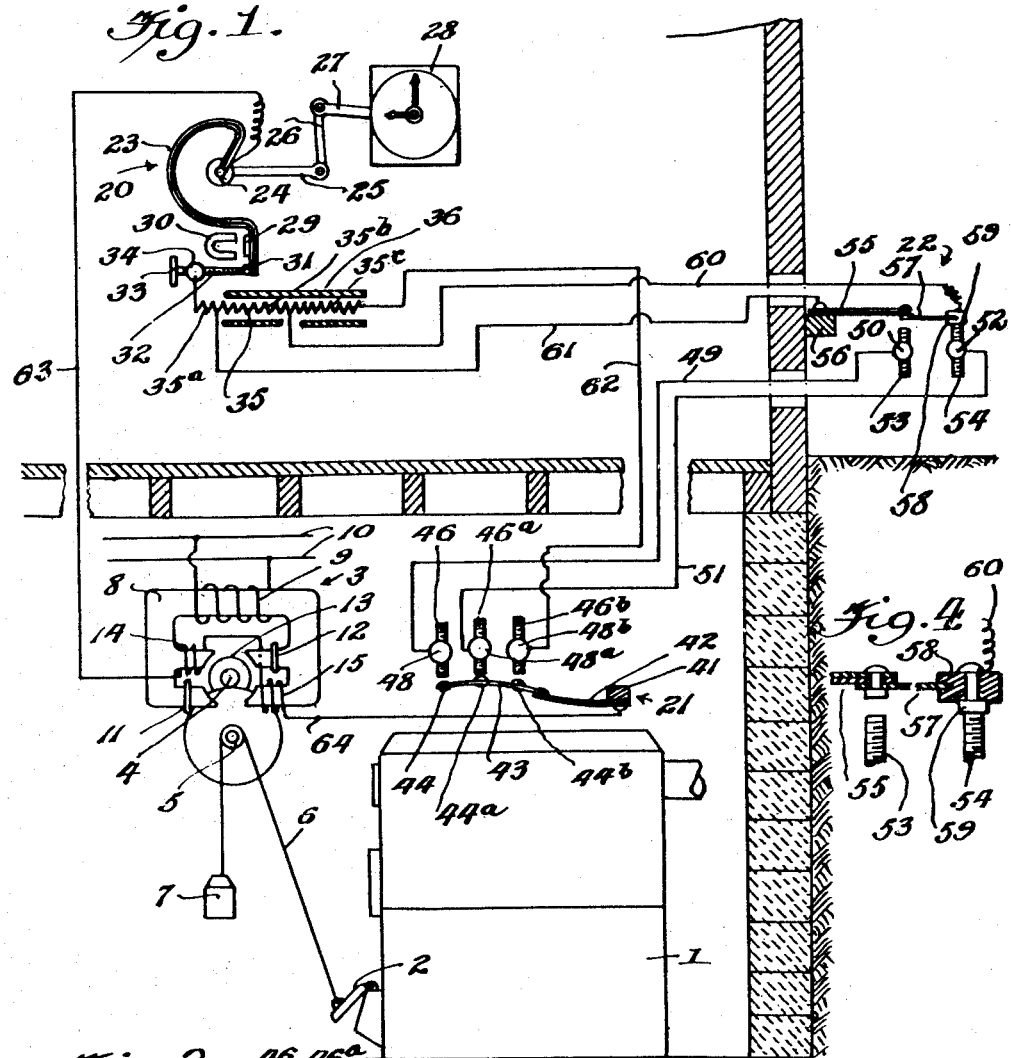
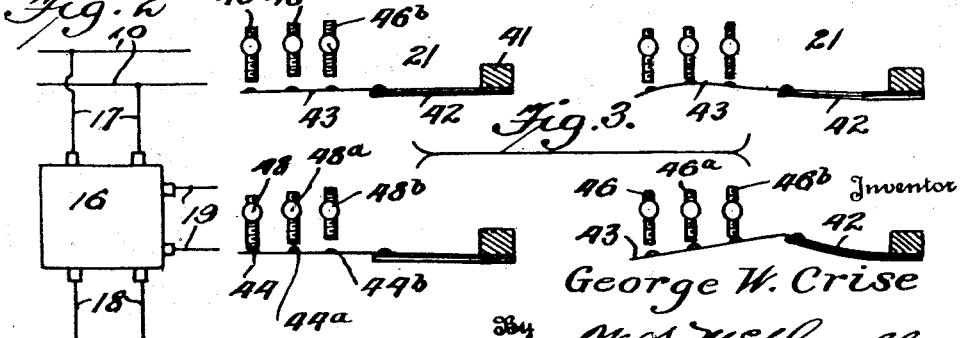
Inventor
George W. Crise
By W. S. McDowell
Attorney Patented Aug. 19, 1947

2,425,998

UNITED STATES PATENT OFFICE 2,425,998

THERMOSTAT CONTROL MECHANISM FOR HEATING SYSTEMS

George W. Crise, Columbus, Ohio, assignor to Crise Manufacturing Company, Columbus, Ohio, a corporation of Ohio Application May 27, 1943, Serial No. 488,708

7 Claims. (Cl. 236—91)

This invention relates to thermostatic switch mechanism, having particular reference to automatic control means of the type employed in governing the operation of electrically actuated means used in automatic or semi-automatic heating systems.

One of the objects of the invention is to provide a simple, efficient and inexpensive system involving automatically operating thermostatic controls which, when employed in connection with a furnace or other heating system, will provide well-regulated operation of such a furnace or heating system under widely fluctuating temperature or weather conditions and without requiring the aid of manually performed seasonal adjustments.

It is well recognized in the art that conventional types of domestic furnace controls, if properly adjusted for cold weather operation, permit overheating of the house in mild weather or, conversely, if properly adjusted for mild weather, are apt to produce underheating of the house in cold weather.

This difficulty results principally from the time lag required for the heat from the fire within the furnace to reach the controlling, room-positioned, thermostat. The application of localized electric heat at the room thermostat to shorten the running cycle of the furnace reduces the problem of overheating, but if used to a sufficient extent to eliminate the difficulty in very mild weather, it oftens causes the room thermostat to shut off the heat supply before any substantial effect of the increased furnace fire reaches the thermostat. Such action during cold weather tends to shut off the heat supply shortly after it is started, with the result that the drafts, stoker, gas or oil burner are caused to operate in short intermittent cycles, thus producing a reduction in heat generation as a result of such part time operation.

The first-mentioned system of supplying artificial heat by means of an electric preheater disposed in the room thermostat is satisfactory for mild weather, providing the action is not so rapid as to cause heating cycles of objectionably short duration. However, this preheater action should be modified to allow longer operating cycles in cold weather. Therefore, in accordance with the present invention, I provide an improved compensating type of room thermostat having a sectional preheater, which operates in response to substantial changes in furnace temperature, such as that produced by warm and cold weather heating conditions, to vary the effect of the preheater on the thermostat. The circuit changing of the preheater, to release more or less heat, is accomplished by a multiple contact furnace thermostat, the latter functioning automatically to enable the preheater within the room thermostat to produce its full capacity of heat or partial capacity depending upon the operating temperatures of the atmosphere adjacent to the furnace.

While the combination of the furnace thermostat and the selective preheating room thermostat gives generally satisfactory service for the average furnace installation, it is not entirely adequate to control such abnormal conditions as those resulting from a sudden change from a cold house to normal room temperature or upon widely fluctuating outdoor temperatures, since in the case of large heat storage capacity heating systems, such as steam or hot water, enough heat may be stored in the circulating fluid to cause overheating before the house temperature approaches the setting of the room thermostat. Such conditions occur frequently with clock-controlled thermostats which allow cooling of the house during certain hours of the night.

Under these conditions, an adequate solution is to limit the furnace or water temperature so that only sufficient heat is generated to bring the house to proper temperature, and for this purpose the thermostat located in or adjacent to the furnace is used. However, to be effective in mild weather, the furnace-located thermostat must be set to throttle the fire at a fairly low temperature, and this low temperature tends to prevent the furnace from providing adequate heat for cold weather. To compensate for this latter condition, the present invention further provides, in association with the room and furnace thermostats, an improved outdoor thermostat, by means of which the operation of the room and furnace thermostats is modified to adapt the system to the heat demands occasioned by changes in temperatures outside the house equipped with the system.

Accordingly, my improved system in a preferred application comprises three thermostatic units, namely, a compensating room thermostat provided with variable preheater, a multiple contact furnace thermostat and an out-of-doors thermostat, the latter functioning to change the operating range of the selective furnace thermostat according to external weather conditions, and at the same regulating circuits on the room thermostat to impart to its heating system a short operating cycle in warm weather and a longer cycle in cold weather.

For a further understanding of the invention, reference is to be had to the following description and the accompanying drawing, wherein:

Fig. 1 is a diagrammatic view disclosing a house heating system provided with the improved thermostatic controls constituting the present invention;

Fig. 2 is a similar view disclosing the use of a relay for governing the operation of the furnace controls in lieu of the shaded pole induction motor set forth in Fig. 1;

Fig. 3 is a group view illustrating the action of the furnace thermostat, showing the latter in its different positions of operation;

Fig. 4 is a fragmentary detail sectional view through the outdoor thermostat.

Referring more particularly to the drawing, the numeral 1 designates a standard coal burning furnace, shown as provided at its bottom with a pivoted draft door 2. In effecting the operation of this door, use may be made of a shaded pole induction motor 3 of the type set forth in my prior patent, No. 2,134,685, dated November 1, 1938. The armature shaft 4 of this motor is employed to drive a wheel 5 about which is trained a cable 6, one end of said cable being connected with the door 2 while its other end may be provided with a counterbalancing weight 7.

The motor 3 comprises a laminated field frame 8 formed with slotted poles, said frame being energized by a primary coil 9 connected to an alternating current source 10. One pair of the poles of said frame is equipped with a set of small closed shading coils 11 and 12 of sufficient current capacity to cause a partial phase splitting, producing counter-clockwise rotation of the armature 13 by the conventional shading coil method. Wound shading coils 14 and 15 are mounted upon the second pair of poles, these wound coils being connected in series and possessing sufficiently larger capacity to overpower the effect of the coils 11 and 12 and to cause reverse phase splitting and consequent motor reversal when their circuit is closed. Thermostatic controls, hereinafter described in detail, are employed for governing the opening and closing of the circuit or circuits in which the coils 14 and 15 are disposed.

It will be clear from an inspection of the drawing that when the circuit to the coils 14 and 15 is open, the latter coils are rendered inactive and the direction of rotation of the motor will be determined by the action of the closed shading coils 11 and 12, the counter-clockwise rotation closing the furnace drafts so that when the coils 14 and 15 are energized, the relatively larger capacity thereof becomes operative, causing the motor to rotate in a clockwise direction opening the drafts and overcoming the action of the coils 11 and 12, producing a reverse phase splitting. The motor thus operates to raise and lower the draft door and thereby controls the rate of fuel combustion within the furnace 1.

The features of the present invention are applicable to all the well-known types of domestic heating systems, such as gas or oil fired burners, mechanical coal stokers and the like. The reversible induction motor shown in Fig. 1 operates satisfactorily when draft door, dampers and check devices are to be automatically operated. When, however, the system is used in connection with heating systems employing a motor driven stoker, an oil burner or motor valve, in lieu of using the induction motor I may substitute therefor an ordinary relay as disclosed at 16 in Fig. 2, said relay being joined with the current source 10 by means of conductors 17. Associated conductors 18 lead from the relay to the motor of the stoker, oil burner or motor valve, and a third set of conductors 19 extend from the magnet of the relay to the thermostatic controls of the present invention.

The present invention resides primarily in the employment of a plurality of cooperative thermostatic switches for governing the operation of electrical or mechanical furnace equipment of the type above set forth. My system involves first the use of a compensating room thermostat indicated generally by the numeral 20; second, a furnace thermostat 21 located on, in or immediately adjacent to the associated furnace or other heating system so that it is responsive to the operating temperatures of the furnace or heating system, and, third, an outdoor thermostatic switch 22, all three switches being interconnected and adapted for the automatic control of an associated electrical appliance, such as the motor 3 or the relay 16 and their associated furnace equipment.

The room thermostat as here disclosed comprises a bimetallic element 23, the latter having its fixed end attached to an axially movable stud 24 carrying a crank arm 25. The outer end of the arm 25, in a preferred form of my invention, may be linked as at 26 with the arm 27 of a clock mechanism 28. The free end of the bimetallic element carries an armature 29 which is spaced from the poles of a permanent magnet 30. Also, the free end of the bimetallic element carries a contact 31 which is adapted to be brought into and out of engagement with an adjustable contact 32 comprising one end of a manually adjustable screw 33, the latter being received within a threaded bore provided in a fixed terminal post 34. It will be understood that the clock mechanism 28 may or may not be used.

Mounted contiguously to the bimetallic element 23 of the room thermostat is a resistance unit 35, which is known in the art as a preheater. This resistance unit consists of separately or collectively energizable sections, indicated by the numerals 35a, 35b and 35c, which may be in whole or in part disposed within a heat-storing metallic conduit 36. By the use of thermostatic means, hereinafter described in detail, the various sections of this resistance unit may be energized automatically, thus varying the heat effect exerted thereby on the element 23. Since, as hereinafter more fully explained, the current flowing through these sections of resistance is substantially constant under all conditions, the total amount of heat generated varies in proportion to the number of sections in circuit. For example, if only the section shown at 35a is energized, the relatively small amount of heat liberated thereby causes the element 23 to respond slowly, so that electrical apparatus joined with the thermostat 20 will have long active operating cycles between periods of inactivity. If the section 35b is energized in connection with the section 35a, a greater amount of heat will be liberated by the resistance unit, so that the operating cycle of the equipment controlled by the thermostat 20 will be of medium duration. If all three sections, 35a, 35b and 35c, of the preheater or resistance unit are simultaneously energized, a maximum amount of heat will be liberated so that the operating cycles will be of shortest duration, as, for example, in mild weather operation.

To obtain this variable control of the heat liberated by the resistance unit 35 of the room thermostat, I employ in combination therewith, the furnace thermostat 21 and, preferably, the outdoor thermostat 22.

In one of its preferred forms, the furnace thermostat comprises a support 41, shown in the drawings as being arranged immediately above the bonnet of the furnace 1. The support 41 has secured thereto the fixed end of a bimetallic warping bar or an equivalent flexing element 42, the latter being so formed that its free end deflects upwardly as the furnace cools and downwardly as the temperature around the furnace increases. The free end of the element 42 carries a spring steel reed 43, and mounted upon this reed is a plurality of spaced contacts disclosed at 44, 44a and 44b. These contacts are adapted for registration with the ends of manually adjustable contact-forming screws 46, 46a and 46b, the latter being shown as positioned in the threaded bores of terminal posts 48a, 48b and 48c, respectively.

The adjustment provided by the screws 46, 46a and 46b and the flexing characteristics of the bar 42 and the reed 43 are such as to cause separate engagement of the contacts 44, 44a and 44b with their respective contact-forming screws. As the bar 42 cools and begins upward deflection, the contact 44 first makes engagement with the contact screw 46. Continued upward movement of the bar 42 brings the contact 44a into engagement with the contact screw 46a, flexing the reed 43 by a rolling action which removes the contact 44 from engagement with the screw 46. Further upward movement of the thermostatic bar 42 then brings the contact 44b into engagement with the screw 46b, and releases the engagement between contacts 44a and screw 46a. The reverse of these operations takes place as the temperature around the bar 42 is increased.

Leading from the post 48 is a conductor 49 which extends to the terminal post 50 of the outdoor thermostat 22. A second conductor 51 leads from the terminal post 48a to the terminal post 52 of the outdoor thermostat. The posts 50 and 52 are arranged in spaced relation and they carry adjustable contact-forming screws 53 and 54 respectively. Above the screws 53 and 54, the outdoor thermostat 22 includes a bimetallic warping element 55 which has the fixed end thereof mounted on a support 56. The outer end of the element 55 carries a spring strip 57, and attached to the outer end of this spring strip is a block of insulating material 58. Carried by this block is a contact 59 which is adapted for engagement with the upper end of the screw 54. The characteristics of the warping element are such that as the ambient temperature increases, the element deflects upwardly, the movement thereof being in opposition to that of the bimetallic element 42.

From the contact 59, a conductor 60 leads to the preheating unit 35 of the room thermostat, the end of the conductor 60 joining the preheater between the sections 35b and 35c thereof. Another conductor 61 leads from the fixed end of the warping element 55 to the preheater, joining the latter between its sections 35a and 35b. A third conductor 62 leads from the terminal post 48b to the outer terminating end of the preheater section 35c, thus completing the circuit connections between the room, furnace and outdoor thermostats. A conductor 63 extends from the shaft 24 of the room thermostat to the wound shading coil 14 of the motor 3, or the conductor 63 may be extended to form a continuation of one of the conductors 19 of the relay 16, shown in Fig. 2. Another conductor 64 leads from the second of the wound shading coils to the thermostatic bar 42, or the conductor 64 may constitute an extension of one of the leads 19 of the relay 16.

In operation, if the temperature adjacent the furnace thermostat should decline to a predetermined degree, the bar 42 deflects upwardly from the position shown at the upper left of Fig. 3 to the position disclosed at the lower left of Fig. 3, in which the contact 44 engages the contact screw 46. At this time current from source 10, passing through primary winding 9 of motor 3, induces current in the coils 14 and 15. This passes from coil 15 by way of conductor 64, bar 42, reed 43, contact 44, screw 46 to conductor 49. If the outdoor temperature surrounding the thermostat 22 is sufficiently low to have flexed the element 55 downwardly until it contacts with the screw 53, current will then pass through element 55, conductor 61 to the section 35a of the preheating resistor.

In the event the temperature around the room thermostat 20 has decreased sufficiently to bring contact 31 into engagement with screw 32, current after passing through the section 35a of the preheater will pass through screw 33, contact 31, bimetallic element 23, and conductor 63 to the return side of the coil 14 of the motor 3, or the relay 16, thereby energizing the motor 3 or said relay to effect the operation of associated furnace or heater controls. It will be understood that the combined resistance of the coils 14 and 15 is relatively high as compared with that of the heater sections, so that the current flowing remains substantially the same regardless of the number of sections in circuit. Therefore, under the conditions just described, the operating cycle of such controls will be comparatively long, since only the section 35a of the preheater has been energized and a minimum value of heat liberated thereby. If the outdoor temperatures are such as to not justify operation on the part of the system, the bimetallic element 55 remains in spaced relation from the contact screw 53, thereby keeping the circuit open.

In the event the outdoor temperature is such that the element 55 does not deflect downwardly to cause its engagement with the screw 53, and yet the temperature around the furnace thermostat continues to decrease, the bar 42 will deflect upwardly to a greater degree to assume the position disclosed in the upper right of Fig. 3, in which the contact 44a engages with the screw 46a and breaks engagement between contact 44 and screw 46. Under these conditions, current will pass from the source 10, through motor 3, conductor 64, bar 42, reed 43, contact 44a, screw 46a to the conductor 51. The latter conductor leads to the terminal post 52 carrying the screw 54 which is maintained in constant engagement, irrespective of the flexure of the element 55, with the contact 59, current passing from contact 59 through conductor 60 to the outer end of the preheater section 35b. Current then flows through section 35b and section 35a of the preheater in series, and if the room thermostat is closed, the current will then travel through the latter and back to the motor 3 or the relay 16. Due to the fact that the sections 35a and 35b of the preheater have been energized, and the current is substantially constant, a greater amount of heat is liberated by the preheater than when the section 35a is energized alone. This will serve to produce a cycle of operation of medium duration on the part of the associated furnace equipment.

If the temperature around the furnace thermostat continues to remain at a low value, further upward deflection of the bar 42 causes the reed 43 to flex so that engagement between contacts 44a and screw 46a is broken and engagement between contact 44b and screw 46b is established, as shown at the lower right of Fig. 3. This permits current to pass from the source of supply through the bar 42, reed 43, contacts 44b, screw 46b, terminal post 48b, through conductor 62 to the outer end of the preheater section 35c of the room thermostat. The entire preheater unit is then energized, including all its sections 35a, 35b and 35c, and if the room thermostat is closed, as shown in Fig. 1, the circuit will be completed by its return through the room thermostat, the conductor 63, motor 3 and to source 10. The energizing of the entire preheater enables it to develop its maximum heat, so that the operating cycles of the associated furnace equipment are of the shortest duration.

By the use of these combined thermostatic controls, the operation of any standard house heating system may be regulated automatically and in precise accord with external weather and temperature conditions and also in accordance with variations in temperature which take place in or around the heating equipment as well as with regard to room temperatures. This does away with improper or often undesired operation obtained through the use of the single room thermostat or, in the alternative, it avoids the necessity of frequent manual adjustments of standard thermostatically controlled equipment in adapting the same to weather or temperature fluctuations. The construction avoids any tendency on the part of the furnace to overheat, since when the temperature surrounding the furnace reaches a definite maximum value, the downward deflection of the bar 42 breaks the motor-operating circuit. Also, if the temperature around the furnace should cool sufficiently to permit engagement between contacts 44 and screw 46, but if the outdoor temperature should be sufficiently mild so that furnace operation would not be justified, the operation of the furnace is prevented by the element 55 maintaining spaced relation from the contact 53. By the inclusion of the sectional preheater in the thermostatically controlled circuits set forth, proper control is readily obtained over the duration of the operating cycles of the furnace, providing short, medium and long periods of operation, depending upon prevailing temperature conditions.

I claim:

1. Thermostatic apparatus for controlling heating systems, comprising a bimetallic element movably deflectable in its response to temperature variations, a localized heating unit for supplying said element with artificially created heat, said unit embodying an electrically energized sectional resistance means, a second temperature deflectable bimetallic element disposed remotely to said first-named element, a spring member carried by the deflectable end of the second element, a plurality of spaced stationary contact devices mounted adjacent to said spring member and adapted to be engaged sequentially thereby upon unidirectional deflection of said second element, and means electrically uniting said contact devices with the sections of said resistance means operative to energize said means sectionally and collectively to vary the liberation of heat therefrom.

2. Apparatus for controlling the operation of heating systems comprising a room-positioned thermostat having a bimetallic element movably deflectable in its response to temperature variations, an electrically energized sectional resistance means disposed adjacent to said element, a second temperature deflectable bimetallic element disposed adjacent to the heat generator of said heating system, a resilient strip carried by the deflectable end of the second element, a plurality of spaced stationary contact devices disposed for sequential engagement with said member upon unidirectional deflection of the second element, and means electrically uniting said contact devices with the sections of said resistance means to selectively energize one or more of said sections through the engagement of said resilient member with said contact devices.

3. Automatic control mechanism for heating systems utilizing a heat generator and an electrically actuated power-supplying unit for increasing or decreasing the heat output of the generator, comprising a room thermostat having a bimetallic switch element, a sectional electrically energized heating resistor embodied in said thermostat, said resistor having one of its terminals electrically connected with said switch element, a second thermostat disposed adjacent to the heat generator and including a deflectable bimetallic switch element, a plurality of spaced stationary contact devices mounted adjacent to and adapted to be engaged sequentially by said element upon unidirectional deflection of the latter, an outdoor thermostat having a bimetallic switch element, a plurality of spaced stationary contact devices engageable with the bimetallic element of the outdoor thermostat in accordance with its deflection in response to varying outdoor temperatures, conductors uniting the contact devices of said generator and outdoor thermostats, and conductors extending from the contact devices of the outdoor thermostat to the sections of the heating resistor of the room thermostat.

4. Control mechanism for heating systems utilizing a heat generator and an electrically actuated power-supply unit for increasing and decreasing the heat output of the generator, a room located thermostat having a bimetallic switch element, a sectional electrically energized heating resistor embodied in said thermostat, a second thermostat positioned adjacent to the heat generator and embodying a deflectable bimetallic switch element, a plurality of spaced stationary contact devices successively engageable with the bimetallic element of the generator thermostat upon unidirectional deflection of the latter, a plurality of separate current conductors extending from said contact devices to the different sections of said resistor, and an outdoor thermostat for regulating current flow through said conductors.

5. In control mechanism for heating systems, the combination with a heat generator and an electrically actuated power supplying unit for increasing and decreasing the heat output of said generator, of a temperature-responsive control apparatus for governing the operation of said unit, said apparatus embodying a room-positioned thermostatic switch having a pair of separable contacts, a bimetallic element in said thermostat on the free end of which one of said contacts is mounted for movement toward and away from the other of said contacts, a sectional electrically energized heating resistor located adjacent to said bimetallic element, a second thermostatic switch positioned adjacent to said heat generator, said second switch having a bimetallic element carrying a plurality of spaced contacts at its free end, a plurality of cooperative adjustable stationary contacts adapted for sequential engagement with the contacts of the bimetallic element of the generator thermostat, an outdoor thermostat embodying a deflectable bimetallic element, a plurality of stationary adjustable contacts positioned in cooperative relation with the bimetallic element of the outdoor thermostat, conductors extending from the stationary contacts of the generator and outdoor thermostats to the sections of said heating resistor of the room thermostat, and conductors extending from the bimetallic element of the room thermostat to the corresponding element of the furnace thermostat, said power-supply unit for the heat generator being disposed in the last-named conductors.

6. Thermostatic apparatus for controlling the operation of heating systems comprising a bimetallic element movably deflectable in its response to temperature variations, a localized heating unit for supplying said element with artificially created heat, said unit embodying a sectional electrically energized resistance means, a second temperature deflectable bimetallic element disposed remotely to said first-named element, a spring member carried by the deflectable end of the second element, a plurality of spaced stationary contact devices mounted adjacent to said member and adapted to be engaged sequentially upon unidirectional deflection of said second bimetallic element, means electrically uniting said contact devices with the sections of said resistance means for selectively energizing one or more of said sections, current conductors leading from the first to the second bimetallic elements, and an induction motor disposed in said last-named conductors, said motor having a pair of fixed shading coils and a pair of opposed wound shading coils of greater shading capacity than the fixed shading coils.

7. Furnace control apparatus comprising a bimetallic element movably deflectable in response to temperature variations adjacent the same, a stationary contact engageable with said element when the latter is in one of its operative positions, a localized heating unit for supplying said element with artificially created heat, said unit embodying an electrically energized sectional resistance means, one terminal of said resistance means being electrically connected with said contact device, a second thermostat disposed in the zone of heat influence of the heat generator of said heating system, current conductors extending from said bimetallic element to said second thermostat, an electrically actuated power supplying unit for increasing or decreasing the heat output of the generator arranged in said last-named conductors, and a plurality of independent current conductors extending from said generator thermostat to the different sections of said resistance means.

GEORGE W. CRISE.

REFERENCES CITED

The following references are of record in the file of this patent:

UNITED STATES PATENTS

| Number | Name | Date |
| --- | --- | --- |
| 2,288,843 | Roland | July 7, 1942 |
| 2,249,215 | Lange | July 15, 1941 |
| 2,262,341 | Shaw | Nov. 11, 1941 |
| 1,883,015 | Shipley | Oct. 18, 1932 |
| 1,997,559 | Hajek | Apr. 9, 1935 |
| 1,402,417 | Hamilton | Jan. 3, 1922 |